US005489751A

United States Patent [19]

West

[11] Patent Number: 5,489,751

[45] Date of Patent: Feb. 6, 1996

[54] COMBINATION D-LOOP/SPLICE FOR SEISMIC LEADER WIRE

[75] Inventor: Gregory W. West, Houston, Tex.

[73] Assignee: Houston Geophysical Products, Inc., Houston, Tex.

[21] Appl. No.: 215,156

[22] Filed: Mar. 21, 1994

[51] Int. Cl.[6] .................... H02G 15/18

[52] U.S. Cl. .................... 174/84 R; 174/68.1; 174/70 S; 174/135

[58] Field of Search .................... 174/84 R, 70 S, 174/88 R, 68.1, 70 R, 135, 136

[56] References Cited

U.S. PATENT DOCUMENTS

| | | | |
|---|---|---|---|
| 2,590,531 | 3/1952 | McLoad | 177/352 |
| 3,211,828 | 10/1965 | Cloud, Jr. | 174/135 |
| 3,777,048 | 12/1973 | Traut | 174/84 R |
| 4,092,488 | 5/1978 | Hayami et al. | 174/84 R |
| 4,710,593 | 12/1987 | Hall, Jr. et al. | 174/88 R |
| 5,331,606 | 7/1994 | Psyched | 367/178 |

*Primary Examiner*—Morris H. Nimmo
*Attorney, Agent, or Firm*—Bush, Moseley, Riddle & Jackson

[57] ABSTRACT

A combination seismic cable handling loop and electric splice includes a U-shaped elastomer member arranged to be hung on a hasp during transportation and storage, and an integrally formed cylindrical elastomer body on the lower end of the U-shaped member which encloses a splice card by which electrical conductors in the end portions of seismic cable sections are joined, such end portions extending through the outer portions of the body which provides strain relief.

9 Claims, 1 Drawing Sheet

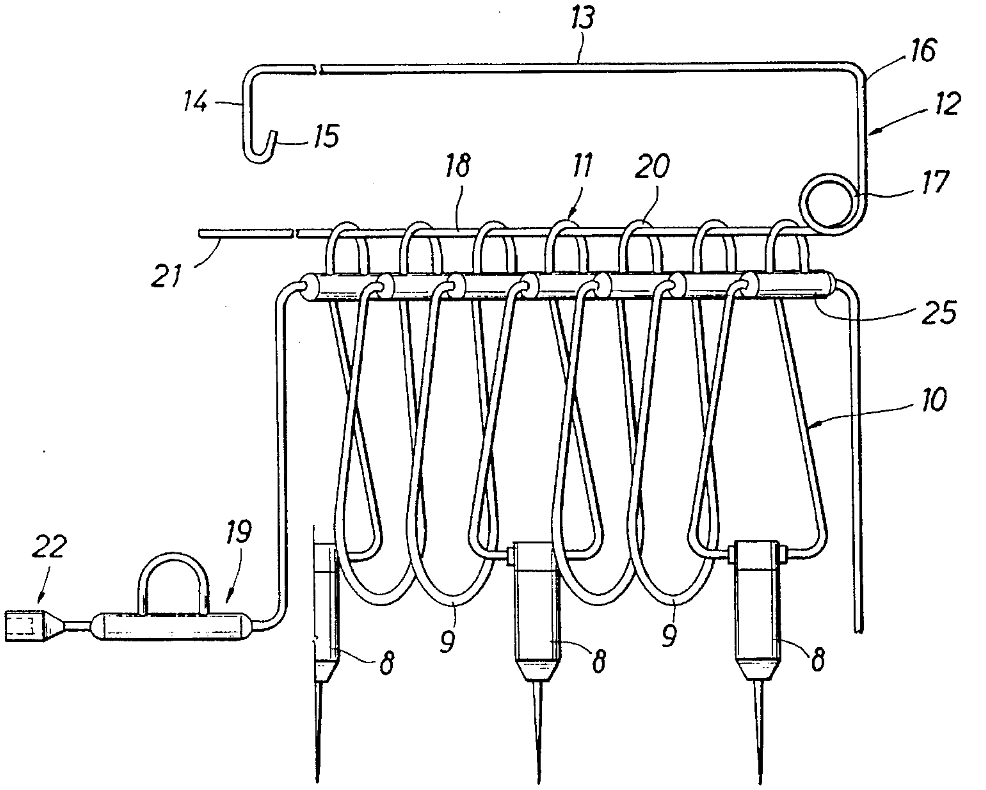
FIG.1
FIG. 4
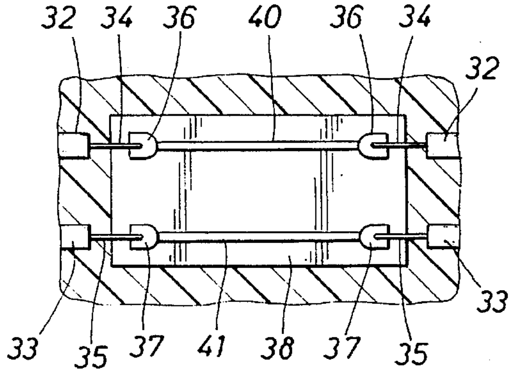
FIG. 2
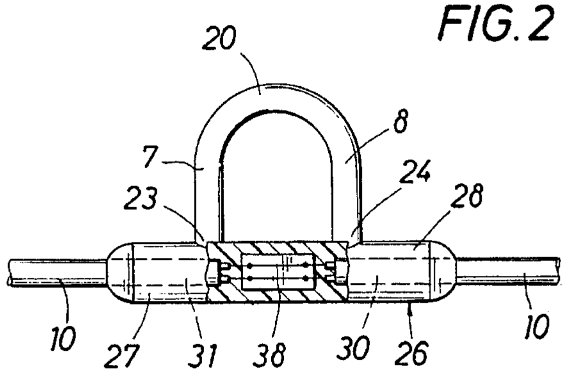
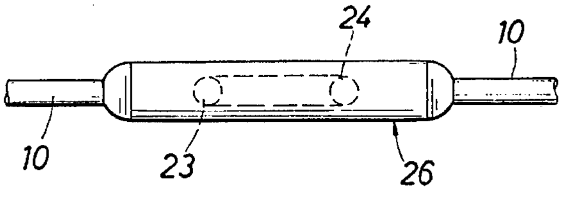
FIG. 3

COMBINATION D-LOOP/SPLICE FOR SEISMIC LEADER WIRE

FIELD OF THE INVENTION

This invention relates generally to devices for storing and transporting geophone leader wires used in seismic exploration, and particularly to a molded D-loop on a leader wire that includes an electrical conductor splice by which the leader wire is joined to a connector assembly which allows sections of leader wire and geophones to be connected end-to-end.

BACKGROUND OF THE INVENTION

In land seismic exploration work, geophones are mounted at spaced points along a length of leader wire and are connected to a multi-conductor cable that leads to a multi-channel recording device. For example, an individual section of leader wire might be about 150 feet long and have 12 geophones spaced therealong and electrically connected to its pair of insulated conductors. Each geophone includes a sensor that is contained in a housing which can be anchored to the ground by a spike on the lower end thereof. After the geophones are properly positioned and the leader wires connected up to the main cable, a suitable seismic source such as a charge of dynamite is exploded to generate acoustic waves which travel down through the earth and are reflected back upward when they encounter boundaries between rock strata having impendence differences. The arrivals at the surface of the reflected waves are detected by the geophones, which sends signals over the leader wire and the multi-conductor cable and to the recorder. The signals are used to construct a map of the underground rock layers, which is highly useful in the discovery of structures which might contain oil or gas.

To facilitate the collection and storage of the leader wires and geophones, so-called "D-Loops" have been used. Instead of coiling or rolling up a string of phones on leader wire which can result in a twisted tangle of equipment, D-Loops which are molded onto the leader wire about every four feet are hung on a hasp structure which resembles a large safety pin. In order to redeploy the geophones along a survey line, the hasp is unhooked and the field person while walking along the survey line permits the D-Loops to slide off of the hasp as the wire and phones are strung out.

In the past, the splices by which the electrical connector on an end of the leader wire was connected thereto were made adjacent the connector. Such splices were delicate and easily damaged in field handling, which caused a loss of signals from the entire length of leader wire on which a group of phones was mounted.

An object of the invention is to provide a new and improved leader wire splice to a connector assembly, such spline being combined with a D-Loop to provide a much more rugged and field-worthy splice than in prior splicing techniques.

SUMMARY OF THE INVENTION

This and other objects are attained in accordance with the concepts of the present invention through the provision of an elastomer D-Loop structure molded on a leader wire and having a U-shaped upper portion whose legs are integral with a tubular body that extends to either side of the upper portion of the loop. Leader wire end sections having an external jacket around a pair of insulated conductor wires extend axially into opposite ends of the body and the exposed conductors extend therefrom having stripped ends that are attached to terminals on a small connector board. The board, for example, can be made out of a section of printed circuit board stock, and has strips of foil or solder extending between the respective terminals. With the electrical connections made up, the center portion of the D-Loop body is molded around the splice board and conductors to provide a sturdy and reliable electrical splice arrangement. The body extends beyond the outer sides of the legs of the D-Loop to provide strain relief where the leader wire is subject to bending. This construction provides a unique dual purpose device including a D-Loop for use in storing and transporting leader wire and geophones, and a splice by which an adjacent element such as a connector assembly is attached to the leader wire.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which:

FIG. 1 is a side elevational view showing a length of leader wire having D-Loops thereon and stored on a hasp;

FIG. 2 is a side view, partly in section, of a combination D-Loop and splice in accordance with the invention;

FIG. 3 is a bottom view of the device shown in FIG. 2; and

FIG. 4 is an enlarged, fragmentary sectional view illustrating the connection of conductor wires to a splice card.

DETAILED DESCRIPTION OF A PREFERRED EMBODIMENT

Referring initially to FIG. 1, a length of geophone leader wire 10 having a plurality of D-Loops 11 thereon is shown stored on a hasp 12 in a manner such that sections 9 of the wire hang between adjacent D-Loops. The D-Loops 11 are positioned at spaced points along the leader wire 10, for example at about ever four (4) feet. The wire 10 can be about 150 ft. long and have about a dozen geophones 8 mounted thereon at spaced points, for example about every twelve feet. In this manner three D-Loops 11 are found between each pair of geophones 9. The hasp 12 can be made of spring wire and has a top arm 13 and a lower arm 18 connected at their inner ends by a vertical leg 16 and several wire coils 17. The outer end of the upper arm 13 is bent downward to provide a vertical leg 14 that terminates in a hook 15. The hook 15 can be engaged with the outer portion 21 of the lower arm 18 in order to trap the D-Loops 11 and the leader wire 10 on the hasp 12 for ease of transportation and storage. One D-Loop 19 is shown as having been removed from the lower arm 18, and is located adjacent to a multi-pin electrical connector 22 by which the end of the leader cable 10 is connected to the main seismic cable (not shown). As will be described in detail below, the D-Loop 19 is combined with a splice in accordance with the present invention. Each of the other D-Loops 11 has a U-shaped upper portion 20 whose lower ends are joined to a tubular body 25 in a manner such that a short length of the leader wire passes axially therethrough. Typically each of the D-Loops 11 is molded onto the leader wire 10 in a single operation as an aid to handling, storage and transportation.

As shown in FIG. 2, the D-Loop 19 also has an inverted, U-shaped upper portion 20 which is received on the hasp arm 18 during transport and storage. The lower ends 23, 24 of each side leg 7, 8 of the portion 20 are joined to a molded cylindrical body 26 having an outer diameter that is somewhat larger than the outer diameter of the leader wire 10. The opposite end portions 27, 28 of the body 26 extend well beyond the outer sides of the legs 7, 8 and then taper inward to the diameter of the leader wire 10. The extension of the portions 27, 28 provides strain relief due to bending of the wire 10. The respective end portions 30, 31 of the wire 10 extend into the body portions 27, 28 and are bonded thereto. The inner ends of the wire portions 30, 31 are terminated generally just inside the leg ends 23, 24 of the D-Loop 19.

A length of insulation is stripped from each of the conductor wires 32, 33 (FIG. 4) which are inside the respective leader cable ends, and the bare wires 34, 35 are soldered to terminals 36, 37 near the outer ends of a splice member 38 in the form of a printed circuit board card. The card 38 can be generally rectangular in shape, and the terminals 36, 37 are electrically connected by strips 40, 41 of a conductive foil or solder. The card 38, which is made of a nonconductive or dielectric material, is commercially available from Circuit Boards Of America. Reference may be had to U.S. Pat. No. 4,710,593 for further details of the PCB card construction, which is incorporated herein by express reference. The pair of conductor wires 32, 33 can be connected as shown, or two pairs of conductor wires can be connected with strips and terminals as shown in FIG. 4 on both sides of the card 38. Once the conductors 32 and 33 are connected to the splice card 38 as shown, the body 26 is molded thereover to provide a protected and moisture-proof assembly.

The D-Loop 19 and body member 28 can be molded as a unitary device, or preformed leaving a cavity for the splice card 38 as shown in FIG. 2, as well as the bores for reception of the leader wire end portions 30, 31. After these parts are inserted and the splice member up, the region around the card 38 can be potted in with a suitable elastomer to complete the splicing assembly.

OPERATION

To install a combination D-Loop and splice 19 in the leader wire 10, a portion of the outer jacket at the end of the leader wire 10 is removed to expose a length of the insulated conductors 32, 33. Then sufficient insulation is removed from the conductors 32, 33 to expose the bare ends 34, 35. If the conductor wires 32, 33 are stranded, they can be tinned to hold the strands in place. The end portion of the wire 42 coming from the multi-pin connector 22 is prepared in the same manner. Then the bare ends are soldered to the terminals 36, 37 on the card 38 to provide electrical continuity via the strips 40, 41. If the leader wire 10 has four conductors in its center, then the card 38 is inverted and the other two wires are connected in the same way on the other side thereof.

Once the connections are completed, the wire 10 and splice card 38 are positioned in a mold which has an internal cavity arranged to provide the shape of the body 25 and the U-shaped upper portion 20 of the D-Loop. A moldable elastomer substance such as liquid silicone rubber then is injected into the mold, so that after set up and removal from the mold the combined D-Loop and splice appears as shown in FIGS. 1 and 3. Although the usual splices where the bare wires are twisted together and soldered is within the scope of the present invention, a splice using the PCB card 38 is preferred.

It now will be recognized that a new and improved combination D-Loop and leader wire splice has been disclosed which provides a convenient cable handling, storage and transport device as well as a rugged and sturdy cable splice that will withstand field use. Since certain changes or modifications may be made in the disclosed embodiment without departing from the inventive concepts involved, it is the aim of the appended claims to cover all such changes and modifications falling within the true spirit and scope of the present invention.

What is claimed is:

1. A combination seismic cable handling and splice structure, comprising: an inverted, generally U-shaped member having downwardly extending, spaced-apart legs; a generally cylindrical member formed integrally with the lower ends of said legs, said cylindrical member having opposite outer portions which extend outward beyond the outer sides of said legs, said outer portions each receiving an end portion of a seismic cable having insulated electrical conductors therein; and splice means for connecting said electrical conductors to one another inside said cylindrical member at a location between said lower ends of said legs.

2. The combination of claim 1 wherein said splice means includes a nonconductive card having terminal means on opposite ends thereof, said electrical conductors having stripped portions electrically connected to said terminal means.

3. The combination of claim 2 wherein said card is a generally rectangular section of a dielectric printed circuit board, said card having conductive means on outer surfaces thereof that electrically couples said technical means.

4. The combination of claim 1 wherein said U-shaped member and said cylindrical member are jointly molded using a synthetic elastomer.

5. The combination of claim 1 wherein said outer end portions of said cylindrical member provide strain relief sections to inhibit damage to said splice means during handling.

6. A combination seismic cable handling, storage and splice structure, comprising: an inverted, generally U-shaped elastomer member having downwardly extending spaced-apart legs and a curved upper portion adapted to be hung on a hasp; a generally cylindrical elastomer body joined integrally to the lower ends of said legs and having a central portion extending between said legs, said body having opposite end portions extending outwardly beyond the opposite outer sides of said legs; said end portions each being bonded to an end portion of a seismic cable having insulated electrical conductors projecting from the ends thereof, each of said conductors having a portion of its insulation removed to provide bare wires; and splice means within said central portion of said elastomer body for electrically connecting said bare wires and thus said conductors.

7. The combination of claim 6 wherein said splice means includes a nonconductive card member having terminal means at each end thereof, said bare wires being attached to said terminal means.

8. The combination of claim 6 wherein said card member is generally rectangular and has electrically conductive paths extending along at least one side thereof between said terminal means.

9. The combination of claim 8 wherein said opposite end portions of said elastomer body are shaped and constructed to provide relief of strains imposed on said end portions of said splice means on account of handling.

* * * * *